United States Patent [19]

Nishino et al.

[11] 4,408,253

[45] Oct. 4, 1983

[54] VARIABLE CAPACITOR

[75] Inventors: Atsushi Nishino, Neyagawa; Tadashi Suzuki, Katano; Masaki Ikeda, Hirakata; Tadashi Ohtani, Yao, all of Japan

[73] Assignee: Matsushita Electric Industrial Co., Ltd., Kadoma, Japan

[21] Appl. No.: 261,739

[22] Filed: May 7, 1981

[30] Foreign Application Priority Data

May 12, 1980 [JP] Japan ................................. 55-63255
May 12, 1980 [JP] Japan ................................. 55-63256

[51] Int. Cl.³ ............................................. H01G 5/06
[52] U.S. Cl. ............................... 361/293; 361/278
[58] Field of Search ............ 361/293, 312, 298, 303, 361/278

[56] References Cited

U.S. PATENT DOCUMENTS

| | | | |
|---|---|---|---|
| 1,174,600 | 3/1916 | Murdock | 361/312 |
| 1,533,611 | 4/1923 | Respess | 361/293 X |
| 2,619,443 | 11/1952 | Robinson | 361/312 X |
| 3,854,181 | 12/1974 | Matsuware | 361/298 X |
| 3,898,540 | 8/1975 | Brensthaler | 361/293 |

FOREIGN PATENT DOCUMENTS

| | | | |
|---|---|---|---|
| 658675 | 3/1963 | Canada | 361/298 |
| 723669 | 4/1952 | United Kingdom | 361/303 |

Primary Examiner—Elliot A. Goldberg
Attorney, Agent, or Firm—Cushman, Darby & Cushman

[57] ABSTRACT

A variable capacitor, wherein at least one of its stator or rotor electrode is made of aluminum alloy or copper alloy and coated with a thin dielectric material layer containing fluorocarbon resin as its principal component by means of baking, is disclosed. The disclosed variable capacitor is particularly suited for a miniaturization of an appliance which adopts this variable capacitor. Careful qualification of the electrode materials, dielectric material, additional dielectric substance, and conditions for performing the baking and layer forming operation prevent the formation of the oxide film over the surface of the electrode material, and thus ensures a firm adherence of the layer to the substrate and a large maximum capacitance of the layer.

12 Claims, 10 Drawing Figures

VARIABLE CAPACITOR

BACKGROUND OF THE INVENTION

1. Field of the Invention

The present invention relates to a variable capacitor. Particularly, it is concerned with a smaller-size capacitor being excellent in moisture proof property, heat-resistant property, uniform variability in capacitance, mass-producibility, quality-stability and abrasion-resistant characteristics.

2. Description of the Prior Art

The known conventional variable capacitor is usually constituted by sandwiching a dielectric material such as mica, ceramics, or a film of an organic polymeric material between a metal stator electrode and a rotor electrode.

A variable capacitor which employs mica as the dielectric material is excellent in the heat-resistant characteristics endurable for the soldering temperature but has a drawback in that it is inferior in the moisture proof characteristics, the quality-stability and the mass-producibility and thus disadvantageous in view of a desired miniaturization.

On the other hand, another kind of variable capacitor which employs ceramics as the dielectric material is likewise excellent in the heat-resistant characteristics, though it has drawbacks in the points of the mechanical strength, dimensional accuracy, mass-producibility and manufacturing cost.

Therefore, there is another variable capacitor which employs a film of an organic polymeric material as the dielectric material. The film of polymeric material may be polypropylene, polystryene, polyethylene or a fluorocarbon resin. A capacitor which employs such a film is however hard to provide the required dimensional stability because the film may expand or contract at the time of mass-production, and has other problems in the uniform variability in capacitance attributable to uneven adherence of film to both electrodes as well as in the moisture proof and heat-resistant characteristics.

Incidentally, another conventional type of variable capacitor which has at least one substrate metal electrode coated with a film of organic polymeric material by adhesion or fusion has become available.

As one example, there has been proposed a variable capacitor constructed by bonding polyethylene film over the surface of the electrode with adhesives, though it has not been put in practical use yet because of the expensiveness of the organic polymer film, the difficulty in even spreading of adhesives, the aberration of the film in the adhesion process, the expansion of the film by stretching, and the dimensional stability of the film itself.

Furthermore, there has been proposed a use of one which is made by roller-pressing the organic polymeric film on the metal electrode with or without heat-fusion or adhesives. Such an arrangment has, however, not been put to practical use yet beacause of the problems in the accuracy of the thickness of the organic polymeric film, the aberration of the film in the pressing process, the mass-producibility, the manufacturing cost and the like.

SUMMARY OF THE INVENTION

It is therefore the primary object of the present invention to provide a variable capacitor which obviates the previously described drawbacks and disadvantages inherent to the conventional variable capacitors.

It is another object of the present invention to provide a variable capacitor which has an excellent performance but can be embodied in a smaller size.

Other objects and attendant advantages of the present invention will be made clear to those skilled in the art from the following detailed description of the present invention and attached claims.

According to the present invention there is provided a variable capacitor including a stator electrode, a base plate for supporting said stator electrode, a rotor electrode rotatably mounted on said base plate and above said stator electrode, a layer of a dielectric material being sandwiched between the both electrodes characterized in that; at least one of said stator and rotor electrodes is made of an aluminum alloy or a copper alloy and is coated with a baked layer containing fluorocarbon resin as its principal ingredient which serves as said layer of dielectric material.

The surface of said one of the electrodes may preferably be subjected to a surface area enlarging treatment prior to be coated with the dielectric material layer in order to enhance the adhesion strength between the layer and the substrate.

The baked layer of the dielectric material may preferably be a composite material composed of a fluorocarbon resin and another dielectric substance.

The capacitor provided in accordance with the present invention may be embodied in a smaller size with excellent performances, i.e., good moisture proof property, heat-resistant property, durability for soldering process, uniform variability in capacitance, mass-producibility, quality-stability and abrasion resistant property.

DESCRIPTION OF THE PREFERRED EMBODIMENT

In the following description, the present invention will be elucidated in more detail by way of the example shown in the drawings.

Figure 1:
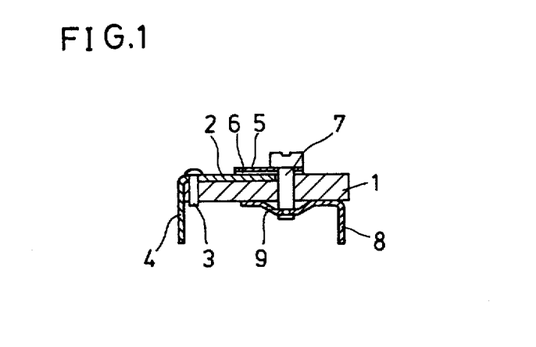
FIG. 1 is a cross-sectional view showing a variable capacitor embodying the present invention.

In FIG. 1, numeral 1 represents a base plate made of an insulator such as synthetic resin. A stator electrode 2 shaped as a half-circle or sector is fixed on the upper surface of the base plate 1 by a rivet 3 so that the upper surface of the stator electrode 2 is in the even plane with that of the part of the base plate 1 where no electrode is provided. A stator terminal 4 is formed integrally with the stator electrode 2.

A rotor electrode 5, likewise shaped as a half-circle or a sector, is placed on the base plate 1 carrying the stator electrode 2, and a layer of a dielectric material 6 is formed on the under surface of the rotor electrode 5 by baking a fluorocarbon resin on the rotor electrode 5. The center of this rotor electrode 5 is connected with a rotating shaft 7 of a conductor material which pierces through the base plate 1. The bottom end of the shaft 7 is retained at the base plate 1 by a hemispherical leaf spring 9 formed integrally with the rotor terminal 8. The periphery of the hemispherical leaf spring 9 presses on the bottom surface of the base plate 1 to make the rotor electrode 5 adhere to the stator electrode 2 sandwiching the layer 6 of dielectric material. In the thus constructed variable capacitor, the layer 6 of the dielectric material may alternatively be provided on the top surface of the stator electrode 2.

In the abovementioned arrangement, what is the most important is the selection of the material for the electrode coated with the layer of the dielectric material 6 and the method of previous treatment therefor. The mass-producibility of the small and high performance variable capacitor depends on the quality of the electrode material.

In order to coat the surface of the electrode with a layer of a fluorocarbon resin of about 10 μm in the precise thickness, it is necessary to coat the surface with an enamel containing the fluorocarbon resin and bake the coated and dried layer, at 380°–430° C. for 5–60 minutes. During the baking process, the fluorocarbon resin is allowed to react with the electrode material at their interface under the atmosphere of the baking oven to physically and chemically change the electrode. Therefore, the selection of the electrode material is of the prime importance in order to attain the object of the present invention.

Namely, there is added to the fluorocarbon resin enamel which later forms the high precision fluorocarbon resin coating layer and serves as the dielectric material, a colloid stabilizing agent, a surfactant and a fusion-promoting agent for stabilizing the fine particles of the fluorocarbon resin dispersed in the enamel paint as well as various pre-treatment agent and oxidizing agent which take parts in the previous treatment of the electrode. Although it may depend on the material of the electrode, the thickness of the layer, the extent of the fluorination of the fluorocarbon resin and the particle size of the resin, a temperature of 380°–430° C. is usually required for the baking process performed for 5–60 minutes. If the quality of the electrode material is not properly selected, it might be softened or oxidized during the high temperature treatment to lead a poor adhesion strength of the fluorocarbon resin to the surface of the electrode.

The present inventors have investigated on the quality of aluminum electrode material in terms of the softening due to the high temperature during the baking process and its effects on the workability in the mass-producing machining, the results of which are summarized in Table 1 below (O indicates a good workability while X indicates a poor workability).

TABLE 1

| | Component and quantity of impurities | | | | | Purity of alumi-num | Work-ability after baking |
|---|---|---|---|---|---|---|---|
| | Cu (%) | Si (%) | Fe (%) | Mn (%) | Zn (%) | | |
| A | <0.03 | <0.15 | <0.16 | <0.02 | <0.03 | 99.80 | X |
| B | 0.05 –0.20 | (Si + Fe) <1.0 | | <0.05 | <0.10 | >99.50 | X |
| C | 3.8 –4.9 | <0.50 | <0.50 | 0.30 –0.9 | <0.25 | Balance | O |

TABLE 1-continued

| | Component and quantity of impurities | | | | | Purity of alumi-num | Work-ability after baking |
|---|---|---|---|---|---|---|---|
| | Cu (%) | Si (%) | Fe (%) | Mn (%) | Zn (%) | | |
| D | 1.2 –2.0 | <0.40 | <0.50 | <0.30 | 5.1 –6.1 | Balance | O |

Aluminum electrode materials, A, B, C and D listed in Table 1 above, do not show a remarkable oxidation increase in weight or oxidation deterioration at their surfaces during the baking process at about 400° C., though their mechanical strength might sometimes be lowered by being softened during the exposition to the high temperature at the baking step. And they become hard to be worked by a variable-capacitor mass-producing machine or to maintain their dimensional accuracy. Particularly, the aluminum electrode materials A and B in Table 1, having a aluminum purity above 95%, show a softening phenomenon at a temperature at which the fluorocarbon resin can satisfactorily be baked.

On the other hand, aluminum electrode materials C and D, listed in Table 1 above, are found to be suited for attaining the object of the present invention because they do not show a remarkable weight increase caused by the oxidation or a softening caused by the exposition to a high temperature during the baking process of the fluoro-carbon resin coating layer.

As indicated above, if the impurities of Cu, Si, Fe, Zn and the like are included in the aluminum electrode material at a content of 5 weight percent or above, the material becomes to be endurable to the temperature at which the fluorocarbon resin is baked and suited to embody the variable capacitor of the present invention.

The extent or degree of the softening being attributable to the high baking temperature will become important as the thickness of the electrode material of the variable capacitor, which usually ranges from 30 μm to 500 μm, becomes small, and an alloy of Al-Cu-Zn-Si system containing Cu and Zn is found to be excellent for the electrode material of the variable capacitor.

In addition to the aluminum alloy, a copper alloy is also found to be suitable for the electrode material of the variable capacitor of the present invention. It is very hard to embody the electrode material with pure copper notwithstanding its excellent resistance to softening and excellent electrical characteristics, soldering characteristics and the like. The pure copper shows a remarkable oxidation increase in weight and develops blackened surface layer during the fluorocarbon resin baking step, and the blackened surface layer is liable to be peeled off even by a slight mechanical vibration. Furthermore, the required adhesion strength is hard to be obtained because an oxide film grows at an interface between the fluorocarbon resin and the substrate copper as a result of a reaction of the oxidizing agent included in the fluorocarbon enamel with the copper substrate.

As a result of a careful investigation on suitable copper alloys, made on a various aspects, i.e., the corrosion resistant and anti-oxidation properties which will not permit the formation of the oxide film, heat-resistant anti-softening property, soldering property, and electrical property, it is found that a brass composed of 10–40 weight percent of Zn and a balance of copper or a brass including Cu, 75-55%; Pb, less than 0.1%; Fe, less than 0.07% and a balance of zinc is suitable for the electrode material of the present invention, which is to be coated with the layer of the fluorocarbon resin.

The thickness of the electrode material for use in the variable capacitor usually ranges from 30 μm to 500 μm and the smaller the size of the capacitor, the thinner the material will be. The surface of the electrode material should be degreased and washed before the treatment in order to remove any dust, oil or fatty substance, said anti-oxidant therefrom. The electrode material is dried and then subjected to a roughening treatment for enlarging its surface area. The object of this treatment is to make the thickness of the coating layer of the fluorocarbon resin uniform and voidless and to enhance its adhesion strength with respect to the substrate material. The required degree of roughness equals to a surface roughness average value, Ra=0.1–1.8 μm when determined by Talysurf surface roughness gauge. If this value, Ra is under 0.1 μm, disadvantages result therefrom in; an insufficient adhesion strength of the uniform fluorocarbon resin coating layer of about 5–10 82 m in thickness and an incomplete removal of bubbles which occur in the fluorocarbon resin enamel during the coating process and remain even after the coating layer has been cured to provide voids in the layer. Furthermore, the fluorocarbon resin coating layer may be expanded or contracted to cause a flexture thereover and a peeling off of the layer from the substrate metal. These will ake the subsequent working very difficult to perform with high accuracy, when the electrode material coated with the fluorocarbon resin layer is subjected to a punching and forming to give pieces of a shape suitable for the variable capacitor.

On the other hand, the adhesion strength of the fluorocarbon resin coating layer to the substrate metal and the workability of the coated electrode material are remarkably improved and the pinholes in the coating layer decreases, with the increase of this value Ra. If Ra exceeds 1.8 μm, it will become very difficult to maintain the accuracy of the uniform thickness of the coating layer to 5–10 μm. It is therefore recognized that the value should suitably be maintained and controlled in the stated range of 0.1–1.8 μm in order to manufacture a variable capacitor of small size and high accuracy, having a dielectric material layer of the fluorocarbon resin of high performance.

Any means, such as, chemical etching, sandblasting and grinding with emery paper, can be employed for this roughening treatment of enlarging the surface area. The chemical etching and electrolytic etching process are preferable for the aluminum alloys, and the sandblasting and emery grinding are preferable for the copper alloys.

Any methods of spraying, screen printing, bar-coating, drum-printing and the like, can be employed for applying the fluorocarbon resin enamel to the surface of the pretreated electrode material. It is essential to select a method which has high overall economical efficiency in view of the shape, size, kind of the electrode material and the productivity of the variable capacity to be manufactured.

The dielectric material, which is designed to form a uniform coating layer over the surface of the electrode material by the baking process to give a component for a small size and high performance variable capacitor of the prsent invention, must be selected on the basis of the intended improvement in the uniform dispersion of dielectric substance in the coating layer, abrasion resistance, moisture proof property, heat-resistant property, various electrical properties, dielectric strength, mass-producibility and manufacturing cost.

Fluorocarbon resin are dielectric materials suited for the stated object in general. The fluorocarbon resins preferable for the present invention can be exemplified as, polytetrafluoroethylene, a copolymer of tetrafluoroethylene and hexafluoropropylene, polychlorotrifluoroethylene and the like, and a combination of two or more of these resins. The particle size of these resin is preferably under 0.8 μm in average particle diameter, because the resins of the particle size as small as possible are suited for the object of the present invention. The resins of such a small particle size may preferably be obtained by an emulsion polymerization process.

Next, the dielectric substances to be added to the fluorocarbon resin in accordance with the present invention will be described. These substances can be exemplified as mica, rochelle salts such as sodium tartarate, lithium tartarate ammonium and the like, phosphate salts such as potassium dihydrogen phosphate, ammonium dihydrogen phosphate and the like, and octahedron oxygen bodies such as lead titanate, barium titanate, pottasium niobate and the like. These dielectric substances are evenly dispersed and suspended in the fluorocarbon resin enamel and used to form a coating layer containing the resin as well as the substances over the substrates of the electrode material.

The use of the stated combination of the fluorocarbon resin with the dielectric substances has solved various problems. The problems can be exemplified in, the instability of the moisture proof characteristics and the difficulty in maintaining dimensional accuracy when mica is solely used as the dielectric material, and in the fragility, grinding cost and the maintenance of dimensional accuracy which might be raised when a ceramic material variable capacitor is put to the mass-production. Furthermore, the use of the stated combination can reduce the number of laminating layers because the dielectric constant of the material can be made greater. It can also make the maximum capacitance variable because the dielectric constant can be controlled by the amount of the dielectric substance to be added to the fluorocarbon resin enamel.

Incidentally, mica and octahedron oxygen bodies are found to be the most preferred dielectric substance to be combined with the fluorocarbon resin in practical view points of the mass-producibility, manufacturing cost and stability in quality.

Since the average particle diameter of the fluorocarbon resin is selected to be under 0.8 μm, the average particle diameter of the dielectric substance may preferably be in a range 0.4–15 μm and that of about 0.5–2 μm is the most preferred. If the average particle diameter exceeds 15 μm, the surface of the fluorocarbon resin coating layer becomes coarse and sandy, and the colloidal stability of the dielectric substance in the fluorocarbon resin enamel becomes poor to worsen the handling property of the enamel in the mass-production. On the other hand, the cost for pulverizing the dielectric substance would be unacceptably greater and the pulverized substance would become bulky to make the dispersing property of the particle in the fluorocarbon resin enamel poor, if the average particle diameter is selected to be under 0.4 μm. Therefore, a range 0.5–2 μm of the average particle diameter is found to be the most preferable. The amount of the addition of the dielectric substance to the fluorohydrocarbon resin is preferably in a range 1–60 w/w % and the most preferably in a range 4–40 w/w %. No advantage can be expected with the addition under 1 w/w % whereas the required mechanical strength of the fluorocarbon resin coating layer and the colloidal stability of the dielectric substance in the enamel cannot be obtained with the addition of 60 w/w % or greater amount.

The thickness of the dielectric material layer, coated over the surface of the electrode material substrate in accordance with the present invention, is preferably in a range 5–50 μm. If the thickness is smaller than 5 μm, the layer is of a poor dielectric strength because voids are likely produced to pierce the layer. On the other hand, if the thickness exceeds 50 μm, the dielectric material layer is liable to be cracked during the drying or baking process to reduce the dielectric strength, and the electrostatic capacitance becomes small.

Next, details of the drying and baking steps will be described. According to the present invention, the electrode material substrate of aluminum alloy or copper alloy is first subjected to the surface area enlarging treatment and applied with the enamel of the dielectric material containing the fluorocarbon resin as a principal ingredient, then dried at a temperature under 90° C. to remove moisture contained therein and baked.

The baking is performed at 380°–430° C. for 5–60 minutes. Since the substrate is allowed to react with the fluorocarbon resin and with the atmosphere in the baking oven during the baking step and undergoes a physicochemical stage, the material should be of improved anti-corrosive and anti-oxidative properties, and the aluminum alloy or copper alloy is selected as the electrode material. If the electrode substrate is made of aluminum alloy or copper alloy in accordance with the present invention, the anti-oxidative property of the substrate is improved in great deal so that the baking process can be performed even under an oxidative atmosphere. However, formation of the oxide film is sometimes observed to some extent with such the case, depending on the component of the alloy, condition of the previous treatment and the temperature during the baking process. Therefore, the present inventors have investigated on the atmosphere in the baking oven and found that the most favorable results are obtained when the baking process is performed in an atmosphere filled with an inert gas. Any inert gases such as $N_2$, Ar, He and the like are equally found to be suited for the object of the present invention.

Figure 2:
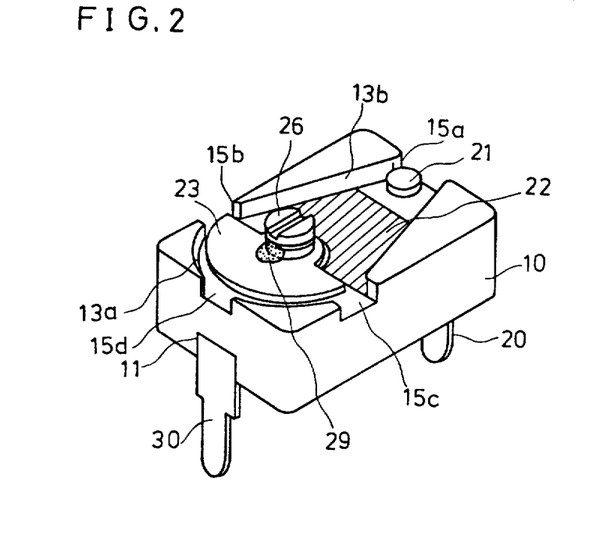
FIG. 2 is a perspective view showing a concrete embodiment of the present invention.
Figure 3:
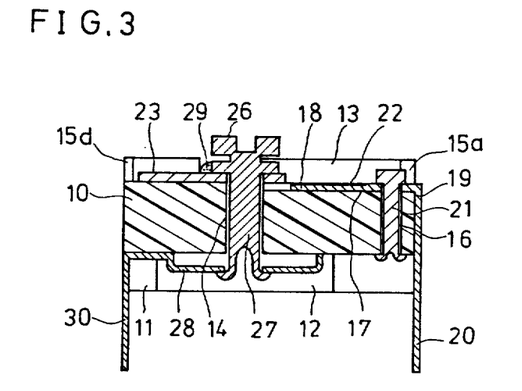
FIG. 3 is a cross-sectional view of the embodiment shown in FIG. 2.
Figure 4:
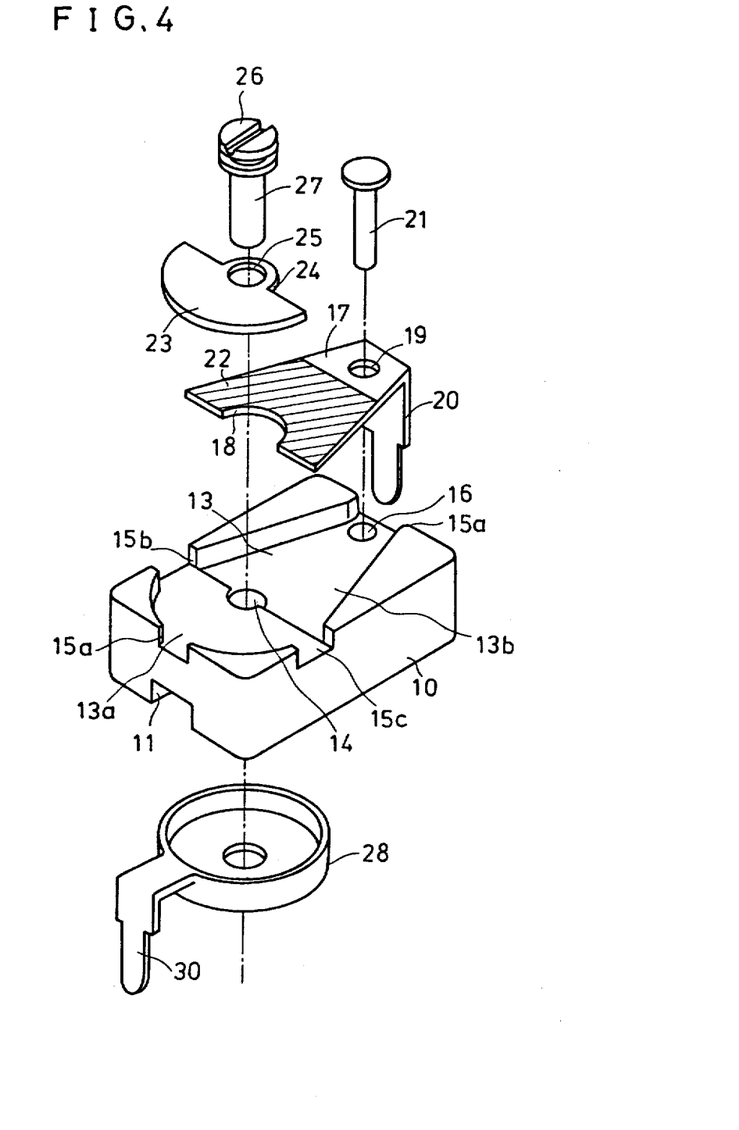
FIG. 4 is an exploded perspective view of the embodiment shown in FIGS. 2 and 3.

A concrete embodiment of the present invention shown in FIG. 2 et seqq. will be elucidated in more detail as follows:

In FIG. 2 through FIG. 4 inclusive, numeral 10 designates a stator base plate molded with an insulator such as synthetic resin, which has a recess 12 with a cut-out part 11 on the bottom face thereof, and a stepped recess 13 composed of a shallow semi-circular part 13a and a deep trapezoid part 13b on the top face thereof. A throughhole 14 is provided at a center of the boundary line between the semi-circular part 13a and the trapezoid part 13b. At the end of the trapezoid part, there is provided a cut-out part 15a and a throughole 16 for accomodating a rivet 21. Cut-out parts 15b, 15c and 15d are also provided at the both ends and the center of the semi-circular part 13a, respectively.

In the trapezoid part 13b of the recess 13 of the stator base plate 13, a stator electrode 17 of trapezoid shape made of an aluminum alloy or a copper alloy is disposed. A part 18 of the stator electrode 17, which corresponds to the throughhole 16, is cut-out in semi-circular shape, and an opening 19 for the rivet 21 is provided at a part corresponding to the throughhole 16.

An opposit tapered end of the stator electrode 17 is bent in right angle and integrally forms a stator terminal 20. The stator electrode 17 is fixed to the base plate 10 by caulking the tip of the rivet 21 which pierces through the opening 19 and the throughhole 16.

A dielectric material layer 22 formed by baking the previously described fluorocarbon resin containing the dielectric substance is coated over the upper surface of the stator electrode 17. The total thickness of the stator electrode 17 and the dielectric material 22 is designed to equal to the difference in depthes of the semi-circular recess 13a and of the trapezoid recess 13b.

A rotor electrode 23 made of a metal plate stamped out in a semi-circular shape is disposed in the semi-circular recess 13a of the stator base plate 10. At a center of the straight line member of the semicircular rotor electrode 23, a semi-circular projection 24, the diameter of which is smaller than that of the semi-circular cut-out part 18 of the stator electrode 17, is formed integrally with the rotor electrode 23, and an opening 25 for a rotor shaft 27 is provided at the center of the semi-circular projection 24.

The rotor shaft 27 having a head 26 penetrates through the opening 25 of the rotor electrode 23, and the throughhole 14 of the stator base plate 10 and its tip is exposed at the recess 12. The exposed tip of the rotor shaft in turn is connected with a leaf spring 28 and caulked to hold the rotor electrode 23 so that the rotor electrode 23 can always contact closely with the dielectric material layer 22 of the stator electrode 17, by a resilient action of the leaf spring 28, when the rotor electrode 23 is rotated. The head 26 of the rotor shaft 27 is mechanically and electrically connected with the rotor electrode 23 by soldering at a point 29.

A rotor terminal 30, which is formed integrally with the leaf spring 28, is lead out from the cut-out part 11 of the bottom face of the stator base plate 10.

Figure 5:
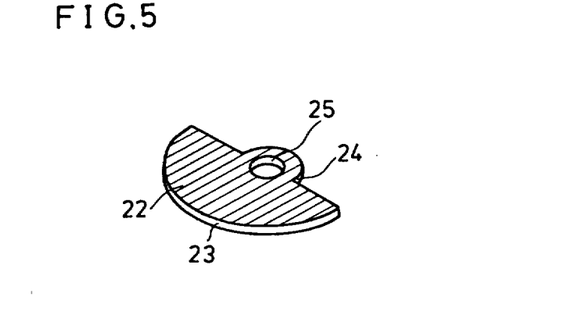
FIG. 5 is a perspective view of a rotor electrode of another embodiment.

The dielectric material layer 22 of fluorocarbon resin may alternatively be formed on the under face of the rotor electrode 23 as shown in FIG. 5, in lieu of the stator electrode 17 of the previously described example. In this case however, the rotor electrode 23 needs to be made of aluminum alloy or copper alloy.

Figure 6:
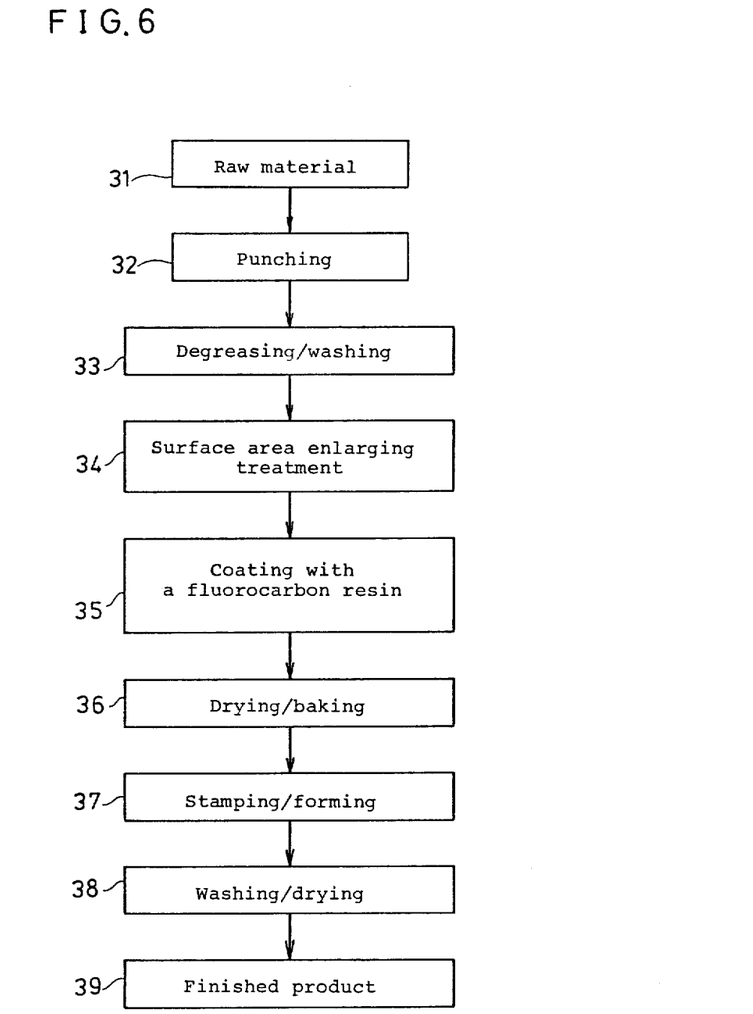
FIG. 6 is a process flow chart illustrating the manufacturing process of the electrode, and FIGS. 7 through 10 inclusive are perspective views showing the electrode under the manufacturing process.
Figure 7:
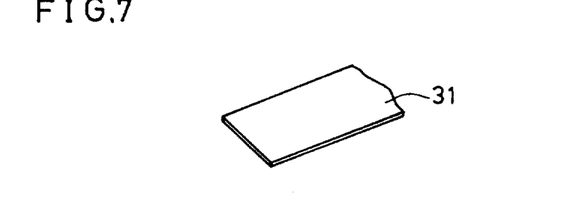
Figure 8:
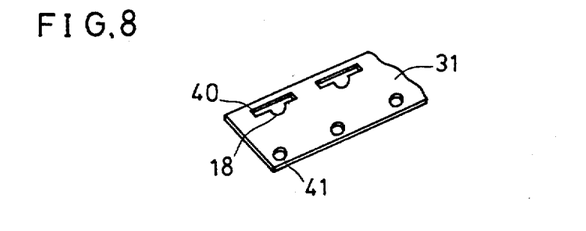
Figure 9:
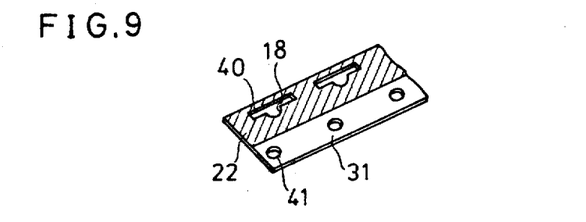
Figure 10:
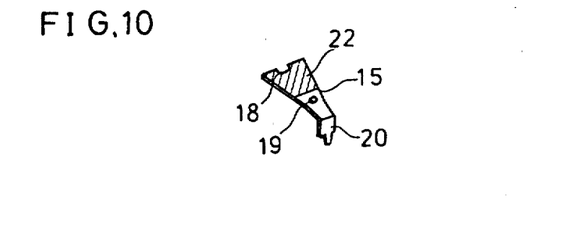

Next, an illustration will be made on the manufacturing process of the abovementioned stator electrode 17 by referring to FIGS. 6 through 10, inclusive. FIG. 6 is a process flow chart of the manufacturing step. Namely, the raw material of aluminum alloy or copper alloy in a belt or strip 31 (FIG. 7) is first punched (32) (FIG. 8), degreased and washed (33) and then dried at 120° C. for 5 minutes. The dried material is then subjected to a suitable roughening (surface area enlarging) treatment (34) suited for the material, masked with a masking sheet, applied with a fluorocarbon resin enamel containing a dielectric substance (35) (FIG. 9), removed of the masking sheet, and baked in a baking oven kept at 390° C. for 10 minutes. Thereafter, the baked material is stamped out (37) (FIG. 10) by a press, washed and dried (38) to give a finished product (39) of the stator electrode 17. The raw material 31 has punched slits 40 which include the semi-circular cut-out parts 18 and perforations 41 for feeding as shown in FIG. 8. It is then coated with the fluorocarbon resin enamel in a given pattern as shown in FIG. 9, and finally stamped out and molded in a shape of a trapezoid with a bent tail as shown in FIG. 10.

Next, a collective evaluation of the manufacturing process, shown in the flow chart of FIG. 6, including the workability and mass-producibility of the product is made by performing a series of experiments, the results of which is summarized in Table 2 below. In the experiments, aluminum materials of pure aluminum and aluminum alloys are roughened by the electrolytic etching, and copper materials of pure copper and copper alloys are roughened by blasting with a blasting powder of alumina to be given the surface roughness factor of 1.0 μm. Each of the roughened materials is washed, dried and then sprayed with an enamel containing polytetrafluorethylene in the thickness of 10±0.5 μm to obtain a stator electrode.

TABLE 2

| Kind of electrode material | Surface area enlarging treatment | Method of applying polytetrafluoroethylene | Remarks | Overall evaluation |
|---|---|---|---|---|
| Pure aluminum | Electrolytic etching | Spray method | Softened at baking to make punching difficult. | X |
| Aluminum alloy A | Electrolytic etching | Spray method | Good in all aspects. | O |
| Aluminum alloy B | Electrolytic etching | Spray method | Good in all aspects. | O |
| Pure copper | Sandblasting | Spray method | Oxide film on both surfaces of material, formed. Fluorocarbon resin film, peeled off. | X |
| Copper alloy A | Sandblasting | Spray method | Good in all aspects. | O |
| Copper alloy B | Sandblasting | Spray method | Good in all aspects. | O |

Composition of the electrode materials used. (w/w %)

Pure aluminum: Al, >99.00; Cu, 0.05-0.2; Si+Fe, <1.0; Mn, <0.05; Zn, <0.1; others, <0.15.

Aluminum Alloy A: Cu, 3.5-4.5; Si, <0.8; Fe, <0.7; Mn, 0.4-1.0; Mg, 0.2-0.8; Zn, <0.25; Cr, <0.1; others, <0.15; Al, balance.

Aluminum alloy B: Cu, 1.2-2.0; Si, <0.4; Fe, <0.5; Mn, <0.3; Mg, 2.1-2.9; Zn, 5.1-6.1; Cr, 0.18-0.35; Ti, <0.2; others, <0.15; Al, balance.

Pure copper: Cu, 100%

Copper alloy A: Cu, 68.5-71.5; Pb, <0.07; Fe, <0.05; Zn, balance.

Copper alloy B: Cu, 62.0-68.0; Pb, <0.07; Fe, <0.05; Zn, balance.

As can be seen from Table 2 above, the electrode materials of pure aluminum and pure copper are not acceptable in view of the softening at the baking step or the development of oxide film which may cause the peeling-off of the fluorocarbon resin coating layer.

In contrast to these, either of the aluminum alloys or the copper alloys has shown the excellent results.

Next, the variable capacitors whose structure is shown by FIGS. 2-4, are prepared by employing the aluminum alloy A and the copper alloy A as the stator electrode material. Table 3 below, in a summary of the results of the measurement of the various characteristics of the variable capacitors. Symbol "O" in the column of overall evaluation of Table 3 indicates "good" whereas that "Δ" indicates, "doubtful acceptability" (also applicable to the following description).

TABLE 3

| | | Surface area enlarging treatment | | | Added dielectric substance | |
|---|---|---|---|---|---|---|
| No. | Kind of alloy | Method | Average roughening factor (μm) | Fluorohydrocarbon resin | Kink | Amount (%) |
| 1 | Aluminum alloy A | Electrolytic etching | 0.05 | Polytetrafluoroethylene | PbTiO$_3$ | 5 |
| 2 | Aluminum alloy A | Electrolytic etching | 0.1 | Polytetrafluoroethylene | PbTiO$_3$ | 5 |
| 3 | Aluminum alloy A | Electrolytic etching | 0.5 | Polytetrafluoroethylene | PbTiO$_3$ | 5 |
| 4 | Aluminum alloy A | Electrolytic etching | 1.0 | Polytetrafluoroethylene | PbTiO$_3$ | 5 |
| 5 | Aluminum alloy A | Electrolytic etching | 1.8 | Polytetrafluoroethylene | PbTiO$_3$ | 5 |
| 6 | Aluminum alloy A | Electrolytic etching | 2.5 | Polytetrafluoroethylene | PbTiO$_3$ | 5 |
| 7 | Aluminum alloy A | Electrolytic etching | 1.0 | Copolymer of tetrafluoroethylene/hexafluoropropylene | PbTiO$_3$ | 5 |
| 8 | Aluminum alloy A | Electrolytic etching | 1.0 | Polychlorotrifluoroethylene | PbTiO$_3$ | 5 |
| 9 | Aluminum alloy A | Electrolytic etching | 1.0 | Polytetrafluoroethylene | PbTiO$_3$ | 5 |
| 10 | Aluminum alloy A | Electrolytic etching | 1.0 | Polytetrafluoroethylene | PbTiO$_3$ | 5 |
| 11 | Aluminum alloy A | Electrolytic | 1.0 | Polytetrafluoroethylene | PbTiO$_3$ | 5 |

TABLE 3-continued

| | | etching | | | | |
|---|---|---|---|---|---|---|
| 12 | Copper alloy A | Sand-blasting | 1.0 | Polytetrafluoroethylene | PbTiO₃ | 0 |
| 13 | Copper alloy A | Sand-blasting | 1.0 | Polytetrafluoroethylene | Mica | 5 |
| 14 | Copper alloy A | Sand-blasting | 1.0 | Polytetrafluoroethylene | KNbO₃ | 5 |
| 15 | Copper alloy A | Sand-blasting | 1.0 | Polytetrafluoroethylene | KNbO₃ | 10 |
| 16 | Copper alloy A | Sand-blasting | 1.0 | Polytetrafluoroethylene | BaTiO₃ | 5 |
| 17 | Copper alloy A | Sand-blasting | 1.0 | Polytetrafluoroethylene | BaTiO₃ | 10 |
| 18 | Copper alloy A | Sand-blasting | 1.0 | Polytetrafluoroethylene | BaTiO₃ | 20 |

| No. | Method of application | Thickness of coating layer (μm) | Cmax (pF) | Remarks | Overall evaluation |
|---|---|---|---|---|---|
| 1 | Spraying | 10 ± 0.5 | 14.52 | Problems, caused in high speed mass-production | Δ |
| 2 | Spraying | 10 ± 0.5 | 14.82 | No particular problem | O |
| 3 | Spraying | 10 ± 0.5 | 15.15 | No particular problem | O |
| 4 | Spraying | 10 ± 0.5 | 15.23 | No particular problem | O |
| 5 | Spraying | 10 ± 0.5 | 14.27 | No particular problem | O |
| 6 | Spraying | 10 ± 0.5 | 15.21 | Problem in uniform variability of capacitance | Δ |
| 7 | Spraying | 10 ± 0.5 | 15.21 | No particular problem | O |
| 8 | Spraying | 10 ± 0.5 | 15.31 | No particular problem | O |
| 9 | Screen printing | 10 ± 0.3 | 15.28 | No particular problem | O |
| 10 | Roller printing | 10 ± 0.3 | 15.15 | No particular problem | O |
| 11 | Bar-coating | 11 ± 1.0 | 14.11 | No particular problem | O |
| 12 | Bar-coating | 11 ± 1.0 | 9.23 | No particular problem | O |
| 13 | Bar-coating | 11 ± 1.0 | 11.43 | No particular problem | O |
| 14 | Bar-coating | 11 ± 1.0 | 14.28 | No particular problem | O |
| 15 | Bar-coating | 11 ± 1.0 | 18.31 | No particular problem | O |
| 16 | Bar-coating | 11 ± 1.0 | 16.29 | No particular problem | O |
| 17 | Bar-coating | 11 ± 1.0 | 21.35 | No particular problem | O |
| 18 | Bar-coating | 11 ± 1.0 | 26.17 | No particular problem | O |

The variable capacitors Nos. 1–6 in Table 3 above are prepared and measured in order to determine the effect of the roughness factor (degree of surface area enlarging) of the electrode materials on the characteristics of the products. It is found that although a variable capacitor can be embodied even with an electrode material of a low average roughness factor Ra under 0.1 μm, the relative strength of adhesion is still insufficient to make the maintenance of the dimensional accuracy difficult to perform because the fluorocarbon resin coating layer expands or contracts with respect to the electrode substrate, or develops a flexure when the electrode material is subjected to the punching or stamping process. It is therefore found that the average roughness factor Ra may preferably be larger than 0.1 μm.

On the other hand, if the average roughness factor Ra exceeds 1.8 μm, the strength of adhesion of the coating layer to the substrate is much improved, but the uniformity of the coating layer, the uniform variability in capacitance of the finished variable capacitor and the performance of the masking is greatly affected adversely (the enamel penetrates into and is dispersed in a clearance between the coating layer and the substrate if the roughness factor becomes great). It is therefore found that the average roughness factor Ra should not preferably be greater than 1.8 μm.

The variable capacitors Nos. 7 and 8 are embodied by employing a copolymer of tetrafluoroethylene and hexafluoropropylene, and polychlorotrifluoroethylene, respectively, in place of the polytetrafluoroethylene. Since all of those fluorocarbon resin have no substantial differences in their dielectric constant, the electric characteristics of the finished variable capacitors are almost equivalent with each other. The polytetrafluoroethylene, however, has excellent moisture proof, heat-resistant and abrasion-resistant properties as compared with the other fluorocarbon resins, and is abundant in its available species, grades and granular sizes. It is therefore found that it is preferable to use polytetrafluoroethylene in view of the mass-producibility.

The variable capacitors Nos. 9–11 are embodied by employing various methods for applying the fluorocarbon resin enamel, containing a dielectric substances, to the electrode substrate, other than the spray method. There are shown a screen printing, roller printing and bar-coating methods. Any methods are found to be able to attain the object of the present invention. It is preferable to select the most economical method by taking the size, ratings and scale of the mass-production of the variable capacitor.

The variable capacitors Nos. 12–18 are prepared and measured to determine the effect of the species and amount of the dielectric substances other than PbTiO₃ added to the fluorocarbon resin coating layer spread over the brass electrode material, on the characteristics of the product. Since the brass does not undergo the surface oxidation during the baking process of the composite material layer of the fluorocarbon resin and the dielectric substance, and is able to be directly soldered, this substrate material is the most suited for the object of the present invention.

Furthermore, it is appreciated from the results shown in Table 3, that the coating layer of the composite fluorocarbon resin containing the dielectric substances such as mica, KNbO₃, BaTiO₃ and PbTiO₃ shows more excellent dielectric characteristics than that of a simple fluorocarbon resin. Although the results in Table 3 do not support a proportional relation between the amount of the dielectric substance added to the fluorocarbon resin and the maximum value of the capacitance of the finished variable capacitor, it is to be understood that the maximum value can be varied by this means, without laminating the electrode of the variable capacitor.

Next, another series of experiments are conducted in order to determine the effects of the surface area enlarging treatment of the stator electrode, the baking temperature, and the atmospheric gas in the baking oven, on the characteristics of the finished product. The results of the experiments and measurements are summarized in Table 4 below. Symbol "X" in the overall evaluation in Table 4 indicates "unacceptable".

adhesion properties are found to be improved in great deal.

The inert gases such as argon and helium other than nitrogen gas are employed in embodying the variable capacitors Nos. 9 and 10 and found to have performances equivalent to nitrogen.

As indicated above, by filling the baking oven with one of the inert gases, it is made possible to prevent the oxidation of the surface of the substrate metal and to form an excellent dielectric material thin layer which fulfil the characteristics of a variable capacitor.

In addition to the previously described electrode materials, aluminized steel which is made by weld-plating an Al-Si alloy on the both surfaces of a steel substrate, or a composite material which is made by press-welding a thin plate of aluminum alloy or copper alloy can equally be used for embodying the variable capaci-

TABLE 4

| No. | Method employed for the surface enlarging treatment | Dielectric substance, added Species | Amount (%) | Baking temperature (°C.) | Gas in the baking oven | Cmax (pF) | Dielectric strength (200V) | Remarks | Overall evaluation |
|---|---|---|---|---|---|---|---|---|---|
| 1 | Sandblasting | — | — | 380 | Air | 9.23 | O | No particular problem | O |
| 2 | Sandblasting | — | — | 400 | Air | 9.55 | Δ | Oxidation on the surface | Δ |
| 3 | Sandblasting | — | — | 430 | Air | 9.82 | X | Oxidation on the surface | X |
| 4 | Chemical etching | — | — | 380 | Air | 9.56 | X | Oxidation on the surface | X |
| 5 | Chemical etching | — | — | 380 | N₂ | 9.75 | O | No particular problem | O |
| 6 | Chemical etching | — | — | 400 | N₂ | 9.66 | O | No particular problem | O |
| 7 | Chemical etching | — | — | 430 | N₂ | 9.72 | O | No particular problem | O |
| 8 | Chemical etching | PbTiO₃ | 5 | 430 | N₂ | 14.73 | O | No particular problem | O |
| 9 | Chemical etching | PbTiO₃ | 5 | 430 | Ar | 14.65 | O | No particular problem | O |
| 10 | Chemical etching | PbTiO₃ | 5 | 430 | He | 14.84 | O | No particular problem | O |

Electrode material: Copper alloy A, Average roughness factor: 1.0 μm, Fluorocarbon resin: Tetrafluoroethylene, Method of application: Bar-coating, Thickness of the coating layer: 10 ± 3 μm.

The variable capacitors Nos. 1–3 in Table 4 above are prepared and measured in ordr to determine the effect of the baking temperature on the product. From the results, it is found that the higher the baking temperature, the weaker the strength of the adhesion of the fluorocarbon resin layer to the substrate will be because of the surface oxidation of the substrate to deteriorate the dielectric strength, when the baking process is carried out in a baking oven filled with air.

Next, the variable capacitors Nos. 4–8 in Table 4 are measured to determine the effect of the surface area enlarging treatment of the stator electrode by means of chemical etching on the product. From the results, it is found that the surface of the substrate metal is oxidized during the baking step performed at a temperature as low as 380° C. if the metal surface has been subjected to the chemical etching (in the case of the baking oven being filled with air). The oxidation is presumed to be attributable to a possible activation of the surface of the substrate metal during the chemical etching process.

If the baking oven is filled with nitrogen, the effect attributable to the difference in the means employed in the surface area enlarging treatment and in the baking temperature disappears, and the electrical characteristics, heat-resistant, abrasion-resistant, anti-oxidation and tor of the present invention.

What is claimed is:

1. A variable capacitor including a stator electrode, a base plate for supporting said stator electrode, a rotor electrode rotatably mounted on said base plate and above said stator electrode and a layer of a dielectric material being sandwiched between the both electrodes; characterized in that;
   at least one of said stator and rotor electrodes is made of an aluminum alloy and is coated with a baked layer containing fluorocarbon resin as its principal ingredient which serves as said layer of dielectric material,
   said aluminum alloy being of a purity under 96 w/w %, and containing 0.1–5.0 w/w % of copper, silicon, iron and manganese.

2. A variable capacitor as claimed in claim 1, wherein said electrode has a rough face on which said baked dielectric material layer is coated.

3. A variable capacitor as claimed in claim 2, wherein an average roughness factor of said rough face is in a range of 0.1–1.8 μm average surface roughness factor (Ra).

4. A variable capacitor as claimed in claim 1, wherein said baked layer of dielectric material is containing at least one of the fluorocarbon resin selected from the group consisting of polytetrafluoroethylene, a copolymer of tetrafluoroethylene/hexafluoropropylene and polychlorotrifluoroethylene.

5. A variable capacitor as claimed in claim 1, wherein a composite material composed of a fluorocarbon resin and another dielectric substance is used as said dielectric material.

6. A variable capacitor as claimed in claim 7, wherein said composite material is containing at least one dielectric substance selected from the group consisting of Rochelle salts, metal dihydrogenphosphates, octahedron oxygen bodies and mica.

7. A variable capacitor including a stator electrode, a base plate for supporting said stator electrode, a rotor electrode rotatably mounted on said base plate and above said stator electrode and a layer of a dielectric material being sandwiched between the both electrodes, characterized in that;
 at least one of said stator and rotor electrodes is made of a copper alloy and is coated with a baked layer containing fluorocarbon resin as its principal ingredient which serves as said layer of dielectric material,
 said copper alloy containing 10-40 w/w % of zinc, 0.1 w/w % or less of iron and a balance of copper.

8. A variable capacitor in accordance with claim 7, wherein said electrode has a rough face on which said baked dielectric material layer is coated.

9. A variable capacitor in accordance with claim 8, wherein an average roughness factor of said rough face is in a range of 0.1-1.8 μm average surface roughness factor (Ra).

10. A variable capacitor in accordance with claim 7, wherein said baked layer of dielectric material is containing at least one of the fluorocarbon resin selected from the group consisting of polytetrafluoroethylene, a copolymer of tetrafluoroethylene/hexafluoropropylene and polychrorotrifluoroethylene.

11. A variable capacitor in accordance with claim 7, wherein a composite material composed of a fluorocarbon resin and another dielectric substance is used as said dielectric material.

12. A variable capacitor in accordance with claim 11, wherein said composite material is containing at least one dielectric substance selected from the group consisting of Rochelle salts, metal dihydrogenphosphates, octahedron oxygen bodies and mica.

* * * * *